United States Patent [19]
McGlynn et al.

[11] Patent Number: 6,048,192
[45] Date of Patent: Apr. 11, 2000

[54] APPARATUS FOR BLOW MOLDING HOLLOW ARTICLES

[75] Inventors: Daniel F. McGlynn, Perrysburg; Robert A. Gillis, Toledo, both of Ohio

[73] Assignee: Owens-Brockway Plastic Products Inc., Toledo, Ohio

[21] Appl. No.: 09/129,274

[22] Filed: Aug. 5, 1998

Related U.S. Application Data

[62] Division of application No. 08/773,454, Dec. 24, 1996, Pat. No. 5,851,479.

[51] Int. Cl.$^7$ ...................................................... B29C 49/60
[52] U.S. Cl. ............................................. 425/536; 425/540
[58] Field of Search ...................................... 425/536, 540

[56] References Cited

U.S. PATENT DOCUMENTS

| | | | |
|---|---|---|---|
| 2,810,160 | 10/1957 | Bottleman | 425/536 |
| 3,342,916 | 9/1967 | Peters | 264/526 |
| 3,450,805 | 6/1969 | Chesser | 264/526 |
| 3,492,106 | 1/1970 | Peters et al. | 264/540 |
| 3,550,197 | 12/1970 | Szajna et al. | 425/536 |
| 3,592,886 | 7/1971 | Havely | 264/526 |
| 3,737,275 | 6/1973 | Kontz . | |
| 3,873,661 | 3/1975 | Kontz . | |
| 3,973,896 | 8/1976 | Peters . | |
| 4,025,276 | 5/1977 | Peters | 425/536 |
| 4,087,503 | 5/1978 | Peters | 264/526 |
| 4,401,423 | 8/1983 | Bellehache et al. . | |
| 4,423,000 | 12/1983 | Teraoka | 264/524 |
| 4,523,904 | 6/1985 | Martin . | |
| 4,549,865 | 10/1985 | Myers . | |
| 4,648,831 | 3/1987 | Johnson . | |
| 4,882,978 | 11/1989 | Bruggeman et al. . | |
| 4,946,366 | 8/1990 | Dundas et al. . | |
| 4,954,310 | 9/1990 | Anderson . | |
| 5,229,043 | 7/1993 | Lee . | |

FOREIGN PATENT DOCUMENTS

| | | | |
|---|---|---|---|
| 1475911 | 4/1967 | France | 425/536 |
| 62-31824 | 6/1989 | Japan . | |
| 2085797 | 5/1982 | United Kingdom . | |
| WO90/07414 | 7/1994 | WIPO . | |

OTHER PUBLICATIONS

Rosato, Blow Molding Handbook, Passage (1989) pp. 282–289.

*Primary Examiner*—Robert Davis

[57] ABSTRACT

A method and apparatus for blow molding plastic articles which utilizes one or more fixed needles and one or more micro vents associated with a blow mold cavity. Each needle has a first passage associated therewith through which vacuum is supplied to pull the molten plastic about the needle and a second passage therein through which air under pressure is introduced to tear the plastic and blow the article to the confines of the mold which has been closed about the plastic parison. Micro vents facilitate exhausting air which is about the parison. Preferably the second passage for compressed air is provided by a central bore and the first passage for the vacuum is provided by an annular space about the fixed needle. In a modified form, the fixed needle comprises dual air passages. Provision is made for utilizing plural molds with controls for supplying air and vacuum.

21 Claims, 13 Drawing Sheets

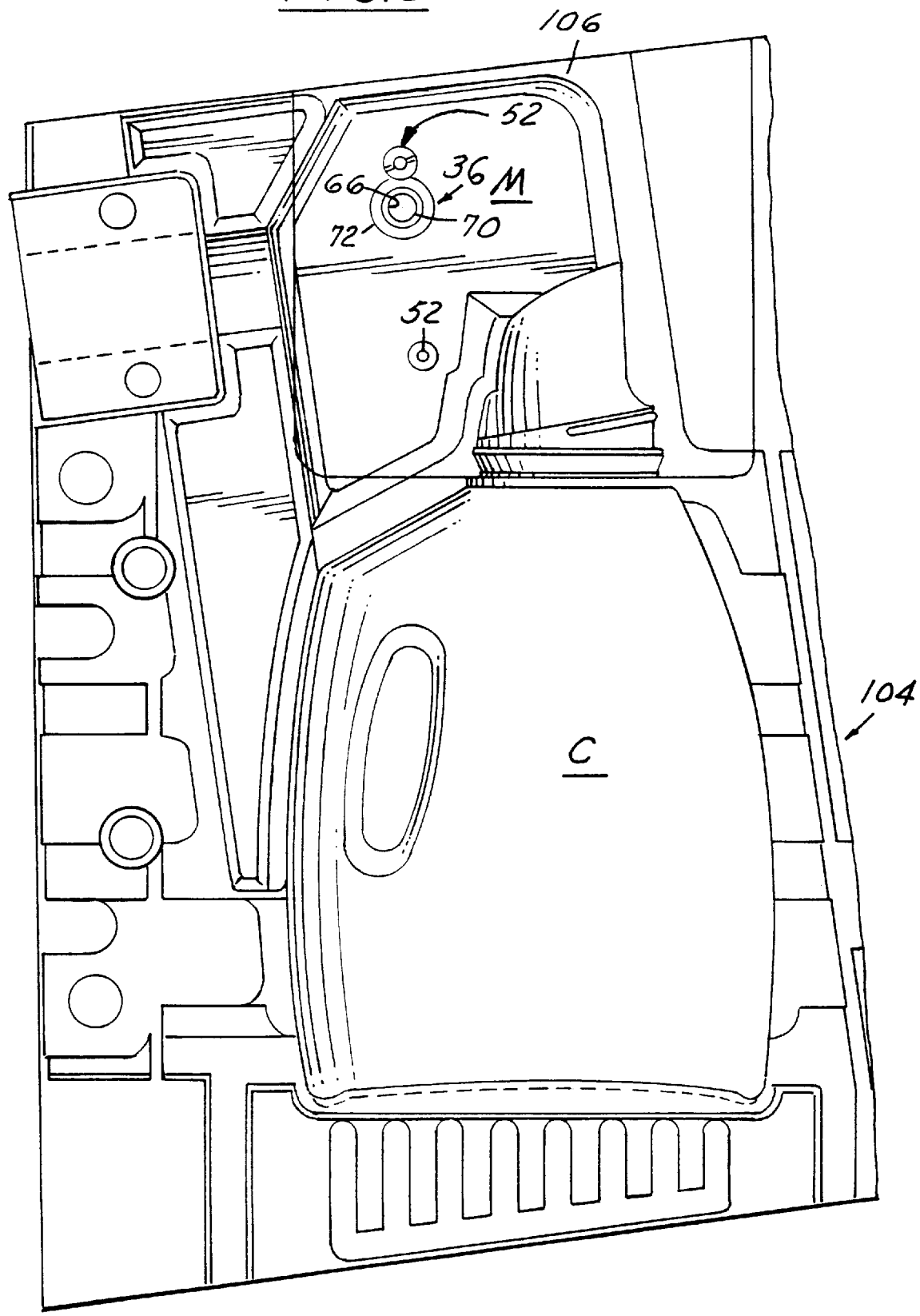

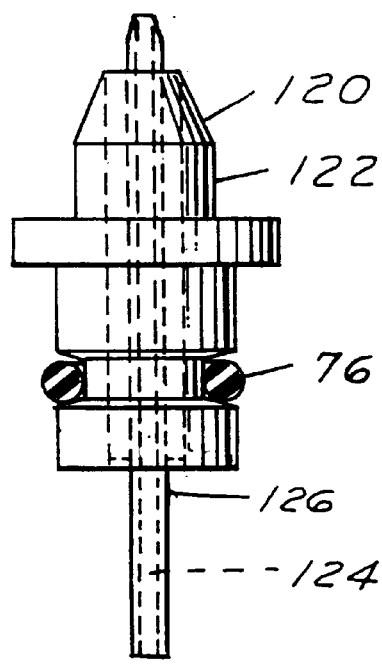
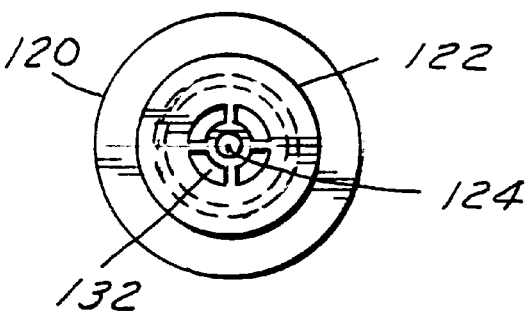
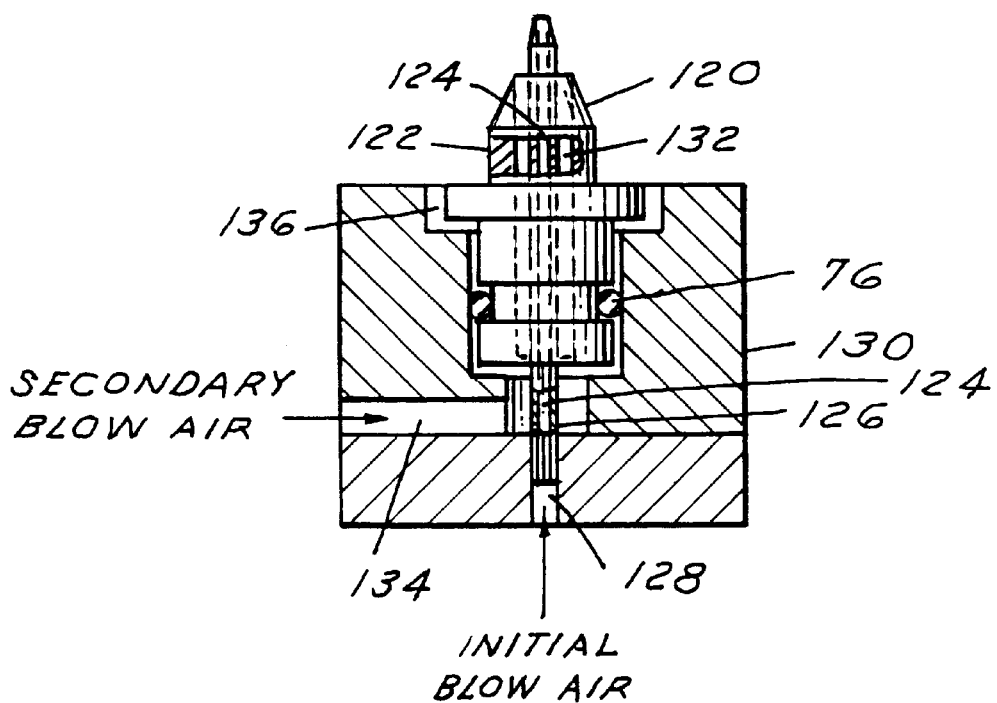

APPARATUS FOR BLOW MOLDING HOLLOW ARTICLES

This application is a division of application Ser. No. 08/773,454 filed Dec. 24, 1996 and now U.S. Pat. No. 5,851,479.

This invention relates to blow molding plastic articles such as hollow plastic containers.

BACKGROUND AND SUMMARY OF THE INVENTION

In the making of blow molded plastic articles utilizing blow molding machines, a hollow plastic parison of molten plastic material in the form of a tube is extruded between two complementary blow mold halves, the blow mold halves are closed and the tube is blown to the confines of the mold by utilizing a needle that pierces the tube and air is introduced into the interior of the tube through the needle to form the article such as a hollow container. One commercially successful arrangement is of the type shown in U.S. Pat. Nos. 3,737,275 and 3,873,661 wherein a movable needle is first advanced by air pressure to penetrate the extruded plastic tube and air is thereafter applied through a bore in the needle to inflate the tube. After blowing, the blowing air is exhausted and the blow needle is withdrawn. Such an arrangement not only uses multiple parts but also requires critical timing to provide for the movement of the movable needle.

Among the objectives of the present invention are to provide a method and apparatus wherein does not require a movable needle; which has no moving parts; which is simpler to construct and maintain; which is less costly; which reduces mold costs by utilizing simplicity of placement, design and manufacture; which has less downtime; which is more reliable; which is more readily maintained; and which facilitates process start up.

In accordance with the invention, the method and apparatus utilizes one or more fixed needles and one or more micro vents associated with the blow mold cavity. Each needle has a first passage associated therewith through which vacuum is supplied to pull the molten plastic about the needle and a second passage therein through which air under pressure is introduced to tear the plastic and blow the container to the confines of the mold which has been closed about the plastic parison. Micro vents facilitate exhausting air which is about the parison. Preferably the second passage for compressed air is provided by a central bore and the first passage for the vacuum is provided by an annular space about the fixed needle. In a modified form, the fixed needle comprises dual air passages. Provision is made for utilizing plural molds with controls for supplying air and vacuum.

DESCRIPTION OF THE DRAWINGS

FIG. 5 is a top plan view of the lower mold half of a mold embodying the invention.

FIG. 21 is an elevational view of a double fixed needle.

FIG. 22 is a bottom plan view of the double fixed needle shown in FIG. 21.

FIG. 23 is a sectional view of the double fixed needle in a mold.

DETAILED DESCRIPTION OF THE PREFERRED EMBODIMENTS

Figure 1:
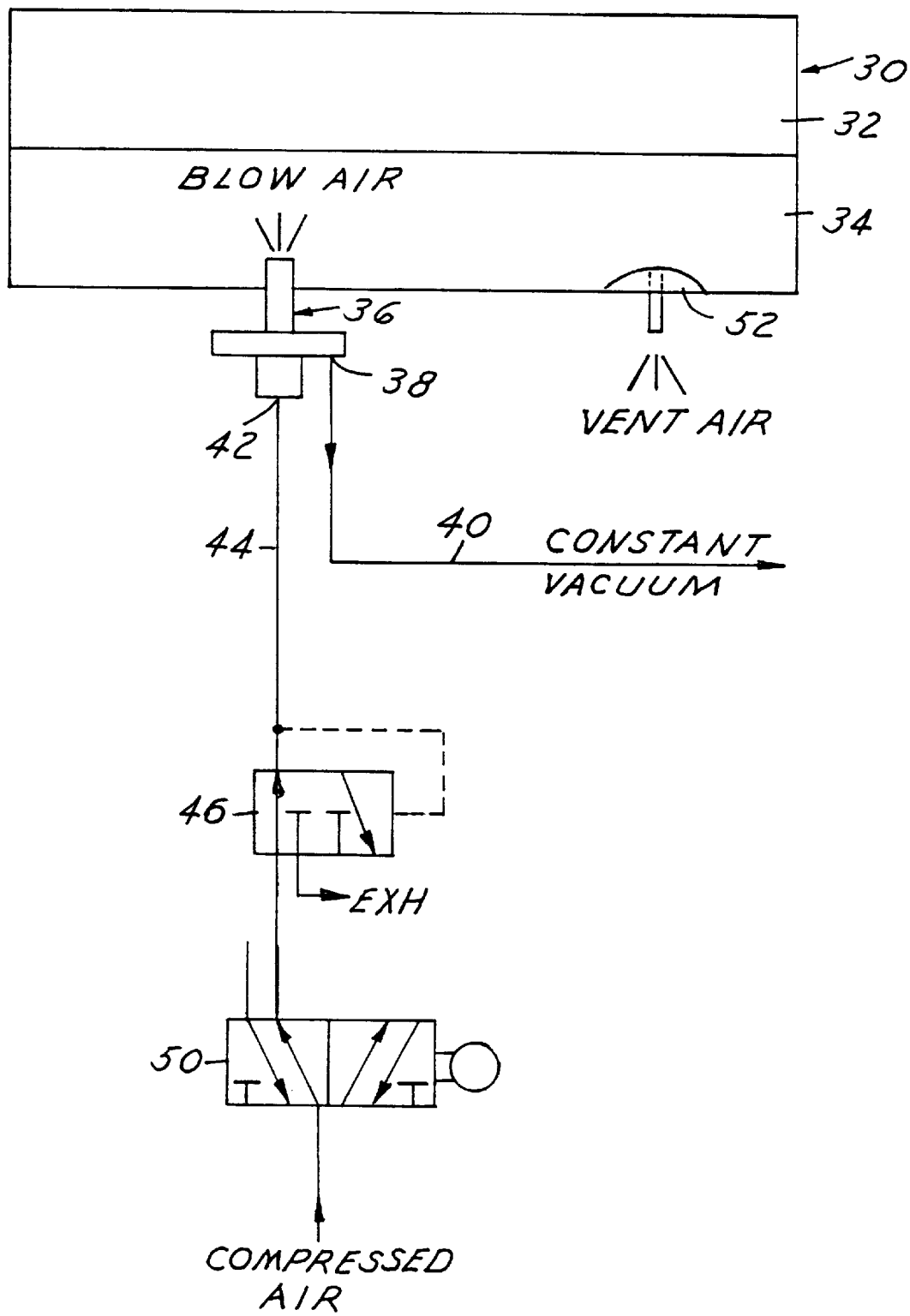
FIG. 1 is a schematic of one embodiment in accordance with the invention.

Referring to FIG. 1 which a schematic of one embodiment of the invention, the method comprises a blow mold 30 which comprises two mold halves 32, 34 which are closed about a plastic parison. A fixed blow needle 36 is provided in at least one mold half 34 and has an inner end extending in to the cavity of the mold 30. The needle 36 includes a first passage 38 surrounding the needle 36 which is connected to a source of vacuum through a line 40. Passage 38 extends to the interior of the mold 30. An exhaust valve 46 functions to exhaust the air in the second passage 42. The needle 36 includes a second passage 42 which is connected to a source of compressed air through a line 44. Passage 42 extends through the fixed needle 36 to the interior of the mold 30. A valve 50 is operable to control the flow of air through line 44. In addition, one or more micro vents 52 are provided in communication with the mold cavity to facilitate venting of the cavity.

The method is preferably provided for use with rotary blow molding machines such as shown in U.S. Pat. Nos. 4,523,904; 4,549,865; and 4,648,831, incorporated herein by reference.

In operation, a plastic parison of molten plastic in the form of a tube is extruded between the mold halves, the mold halves 32, 34 are closed and vacuum is provided through the first passage 38 to pull the plastic about the fixed needle 36. After a short time, for example, on the order of 0.5 second, compressed air is supplied through the second passage 42 to tear the plastic which has been stressed about the fixed needle 36 and the compressed air inflates the parison to the confines of the mold. After the shape of the article such as a plastic container has been set, the compressed air is turned off and another cycle can begin. A typical time cycle comprises 6 seconds.

Figure 2:
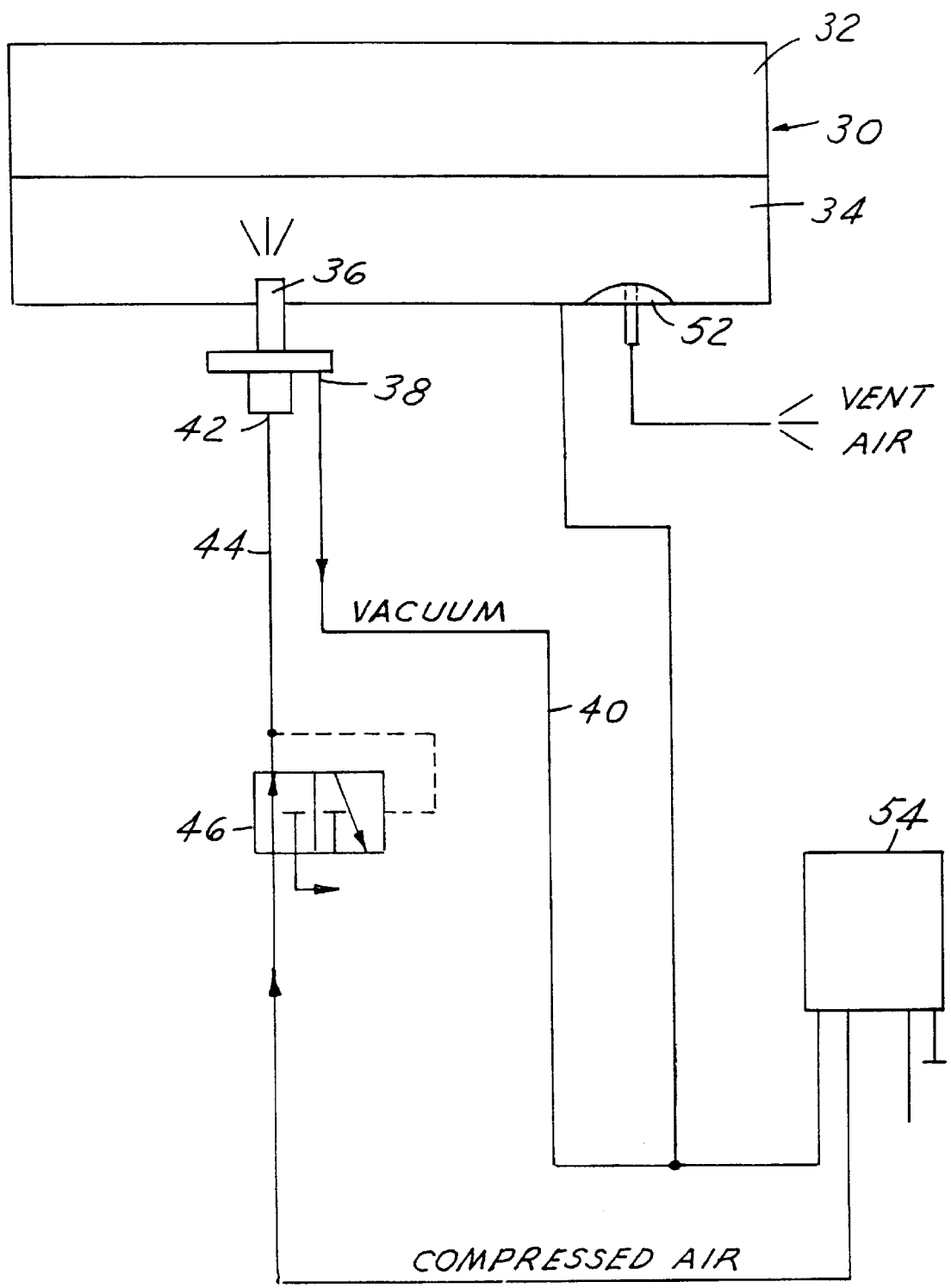
FIG. 2 is a schematic of another embodiment of the invention.

In the schematic shown in FIG. 2, vacuum and compressed air are supplied through a manifold 54. In all other respects the method is the same as that shown in FIG. 1.

Figure 3:
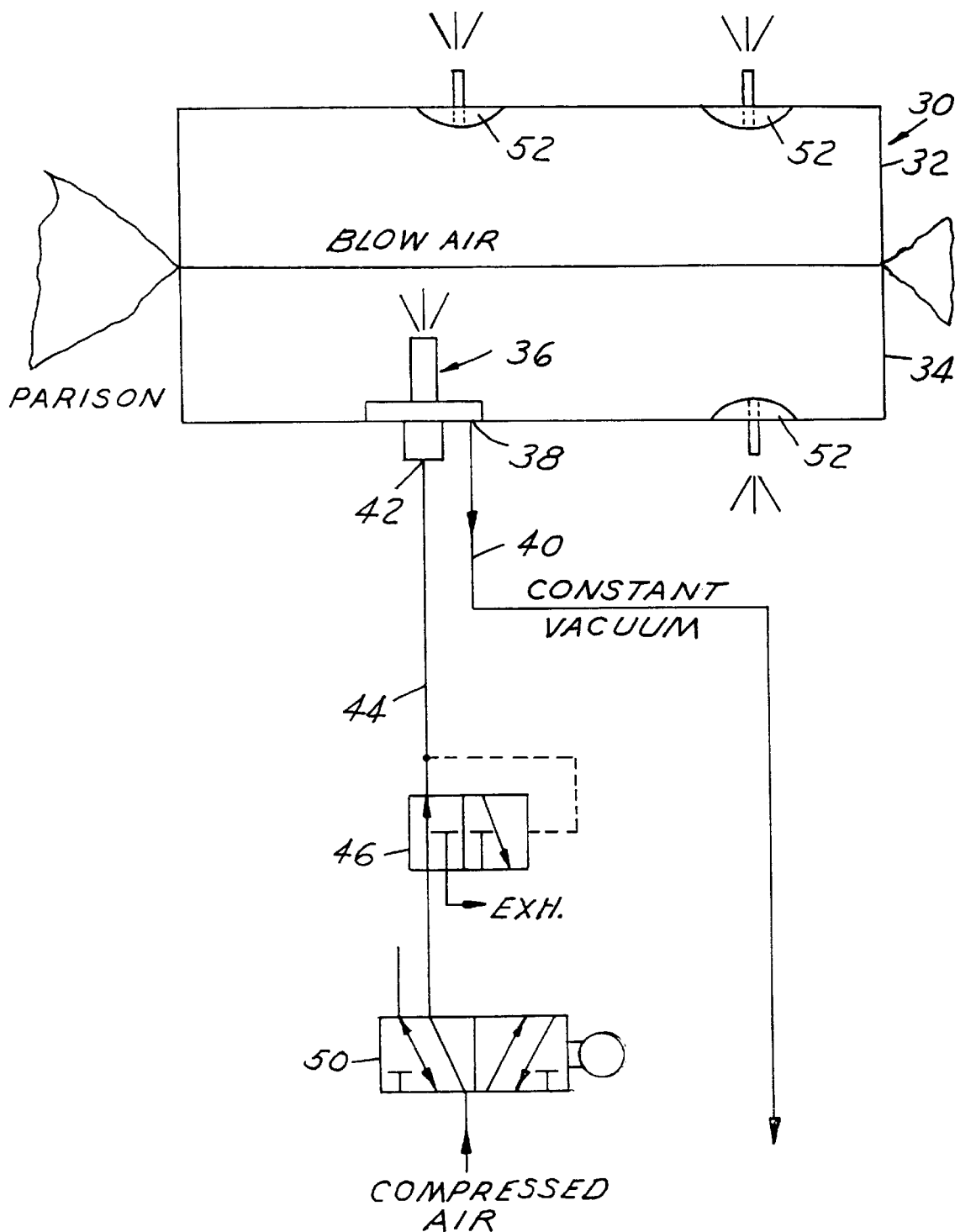
FIG. 3 is a schematic of still another embodiment of the invention.

In the schematic shown in FIG. 3, plural micro vents are provided on mold halves 32, 34 as contrasted to FIG. 1.

Figure 4:
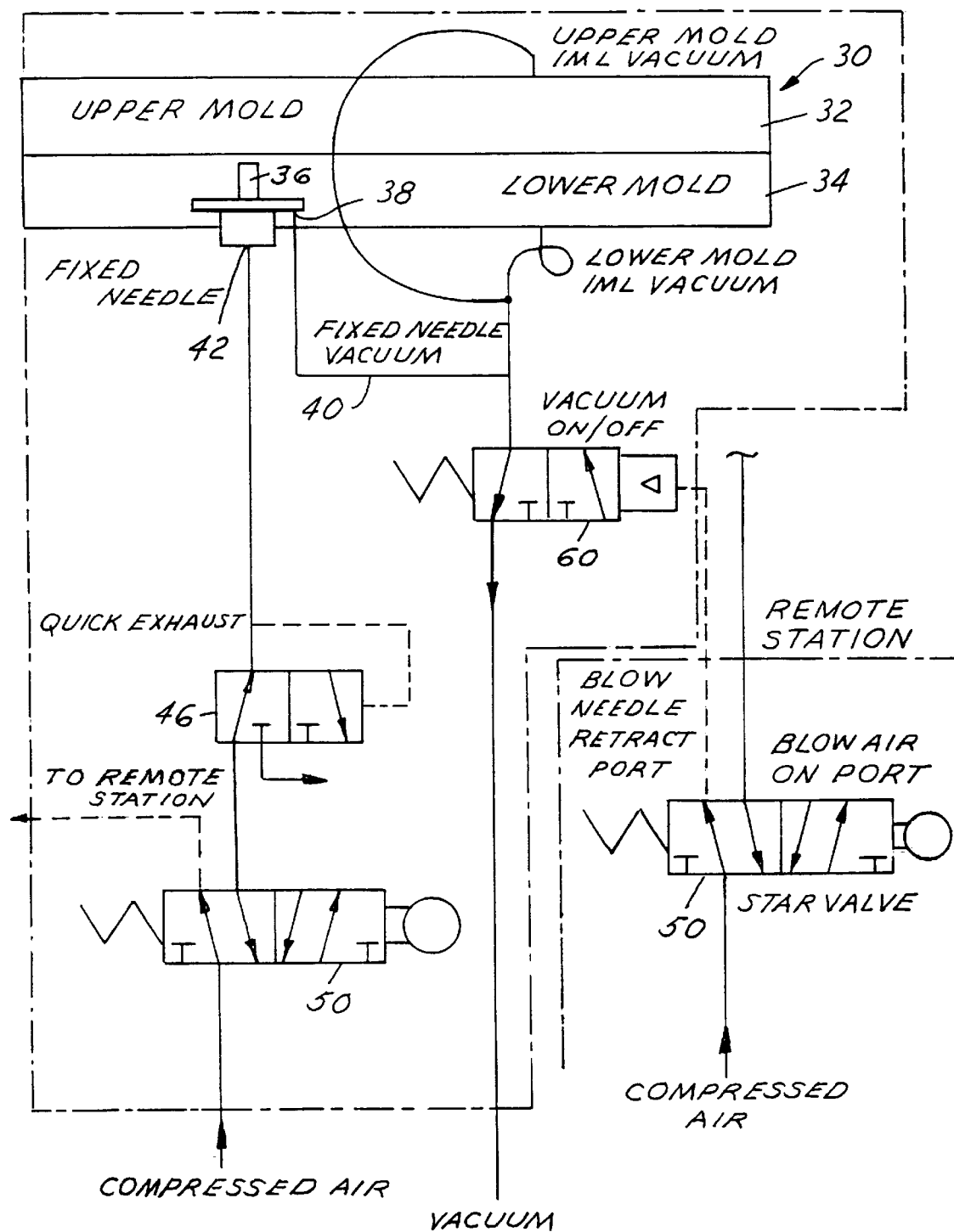
FIG. 4 is a schematic of another embodiment of the invention.
Figure 7:
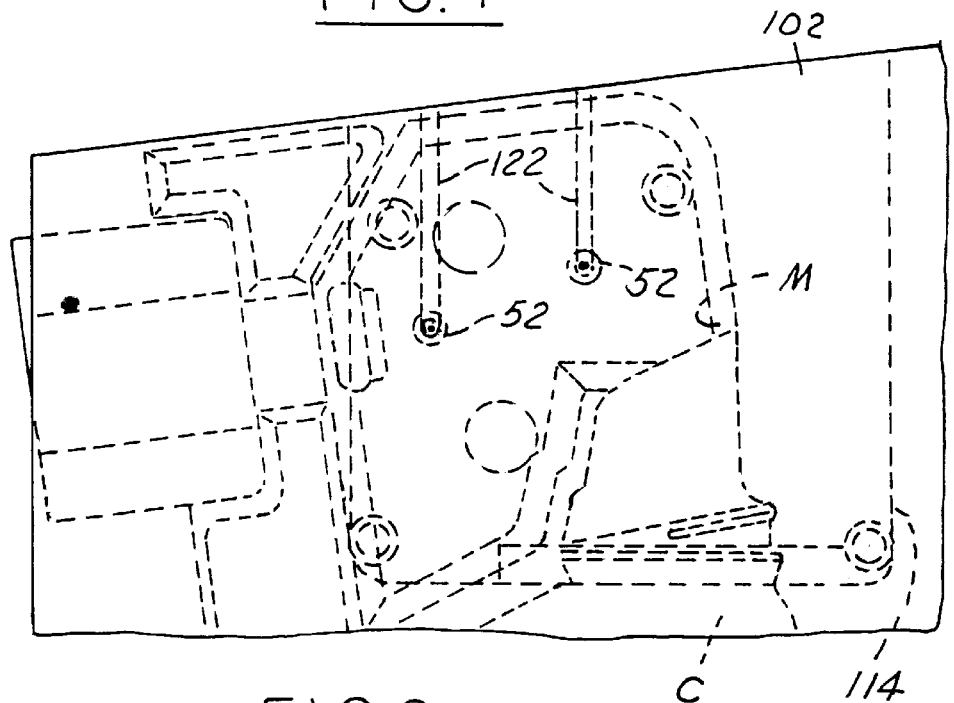
FIG. 7 is a fragmentary top plan view of the mold.
Figure 6:
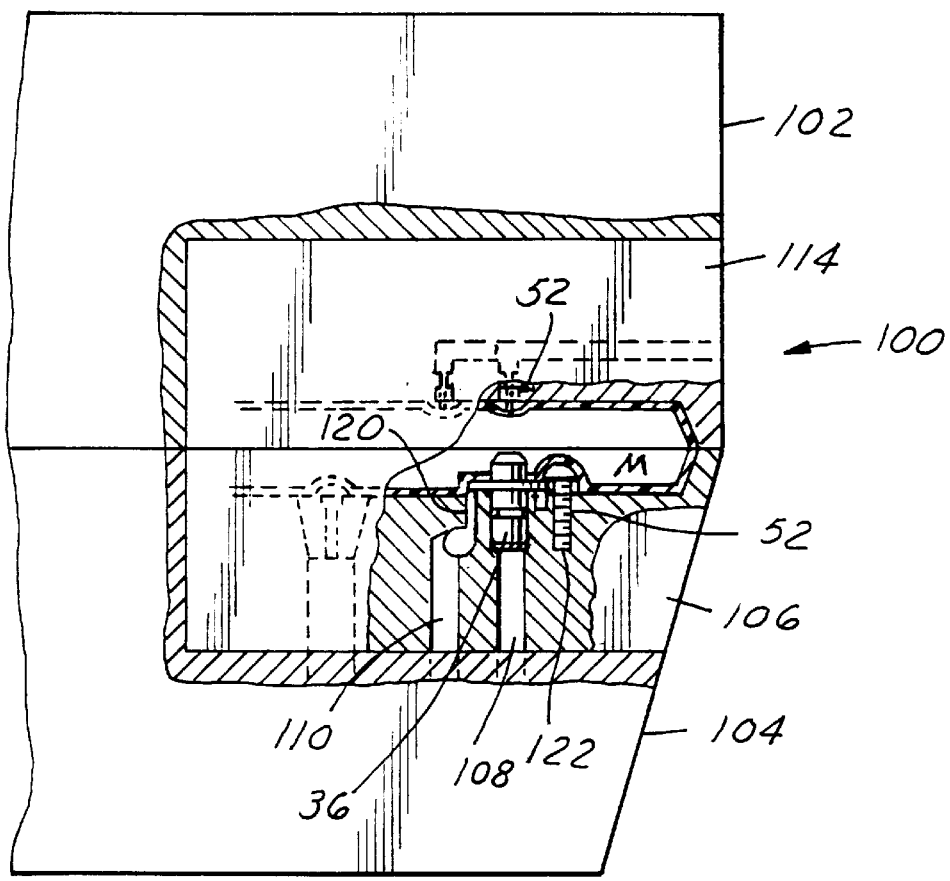
FIG. 6 is a fragmentary part sectional view of a portion of the mold shown in FIG. 5.
Figure 8:
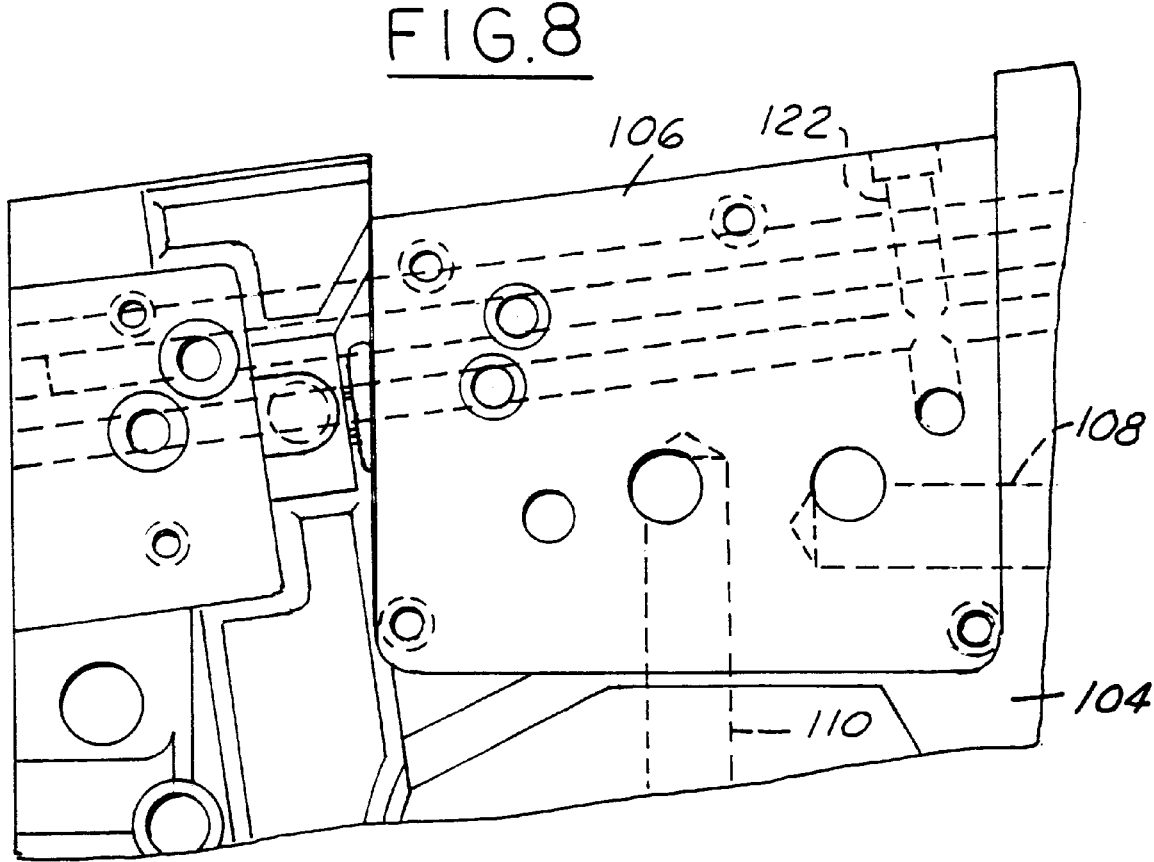
FIG. 8 is a fragmentary top plan view of the lower mold half.
Figure 9:
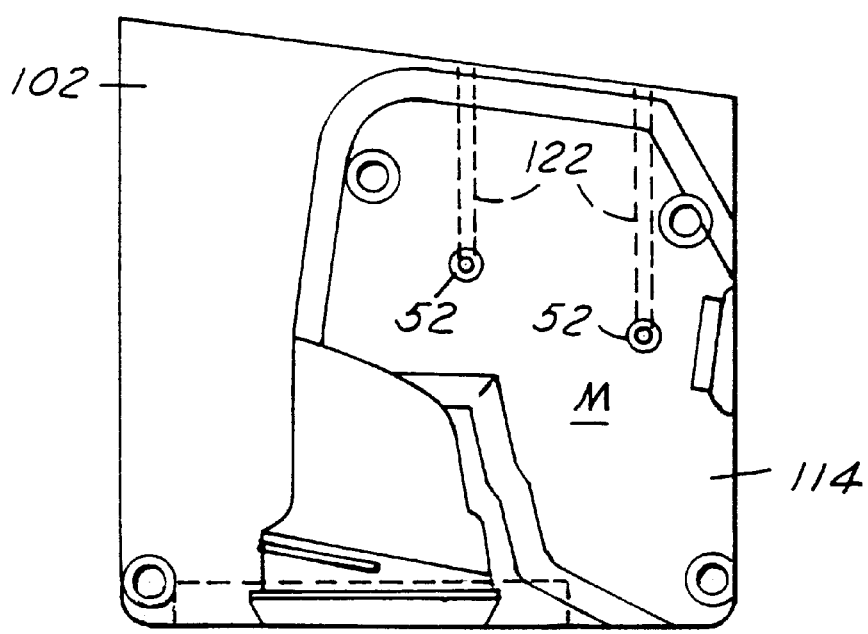
FIG. 9 is a bottom view of the top mold insert.
Figure 10:
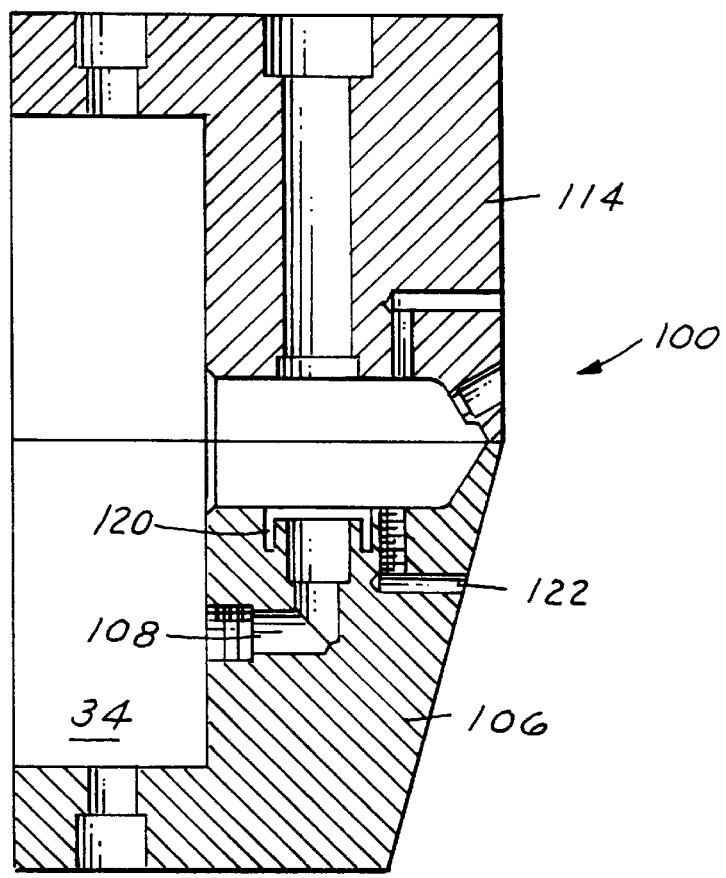
FIG. 10 is a fragmentary sectional view on an enlarged scale of a portion of the mold shown in FIG. 6.
Figure 11:
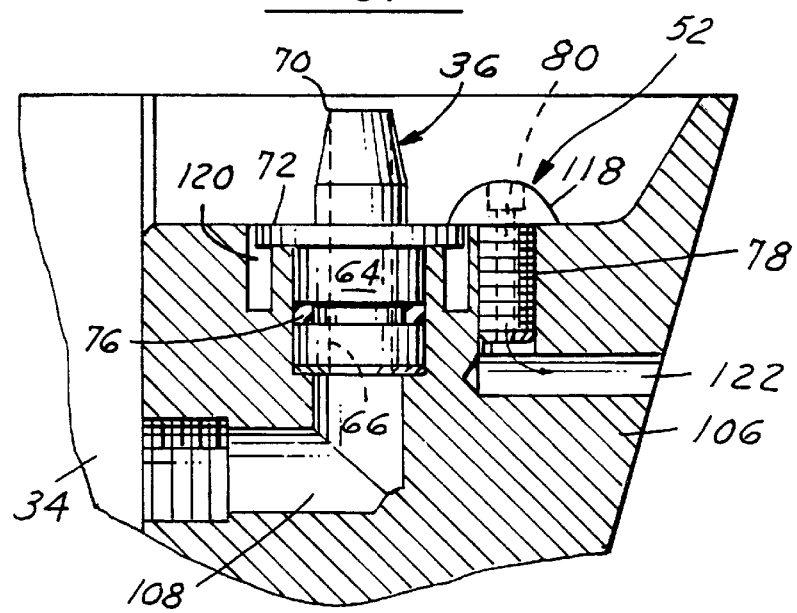
FIG. 11 is a fragmentary sectional view on an enlarged scale of a portion of the mold shown in FIG. 10.

In the modified schematic shown in FIG. 4, the circuit is shown as a part of a wheel type blow molding machine such as that in the aforementioned patents, wherein the blow air valve 50 and vacuum valve 60 of each pair of mold halves are controlled by cams as the wheel rotates as disclosed in said patents, incorporated herein by reference.

Figure 24:
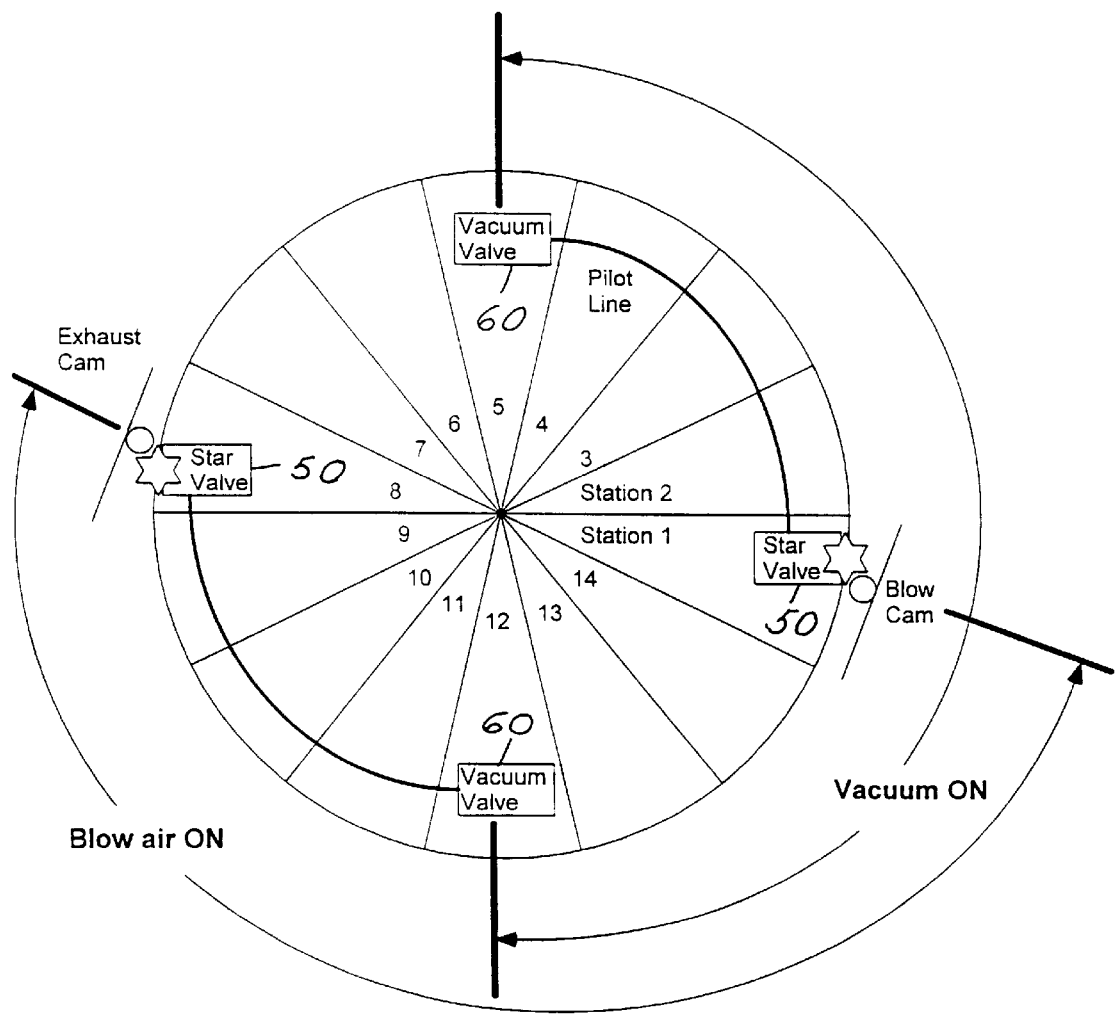
FIG. 24 is a schematic diagram of vacuum and blow air as used in a rotary blow molding machine.

In operation as shown in FIG. 24, the molds are provided about the periphery of a wheel in circumferentially spaced relation such that they move in a closed path in the manner of the aforementioned patents. A first cam is positioned at one station for actuating the air control star valve of each mold as it passes and a second exhaust cam is positioned at a circumferentially spaced station for controlling the exhaust valve of each mold when it reaches and passes that station. The star valve 50 associated with each mold 30 controls the vacuum valve of a subsequent mold to supply vacuum before blow air is supplied and during the first portion of the cycle when blow air is on.

The operation is summarized as follows:

The system is designed that when the BLOW AIR is OFF at the Operator Control Panel, vacuum will be ON to all stations, IML vents and fixed needles.

When the BLOW AIR is ON at the Operator Control Panel, vacuum will be ON only to half of the stations, IML vents and fixed needles.

With the BLOW AIR On, the stations with vacuum ON will be the stations from 12 O'clock to 6 O'clock, clockwise. The vacuum to the mold IML vents and the fixed needle comes ON just before the IML assembly and shuts OFF at the bottom of the wheel.

The chart below shows which station controls the vacuum in another station. It must be noted that the offset is 4 stations.

| Station | Vacuum Valve Location Station | Mold and Fixed Needle Vacuum ON/OFF Controlled by Star Valve Located in Station |
| --- | --- | --- |
| 1 | 1 | 11 |
| 2 | 2 | 12 |
| 3 | 3 | 13 |
| 4 | 4 | 14 |
| 5 | 5 | 1 |
| 6 | 6 | 2 |
| 7 | 7 | 3 |
| 8 | 8 | 4 |
| 9 | 9 | 5 |
| 10 | 10 | 6 |
| 11 | 11 | 7 |
| 12 | 12 | 8 |
| 13 | 13 | 9 |
| 14 | 14 | 10 |

Order of Operation

1. Station #1 engages the Blow Cam. Station #1 blow air comes ON and Station #5 vacuum comes ON.
2. Station #1 engages the Exhaust Cam. Station #1 blow air shuts OFF and Station #5 vacuum shuts OFF.

This operation is repeated for each mold in sequence as the wheel turns.

Figure 25:
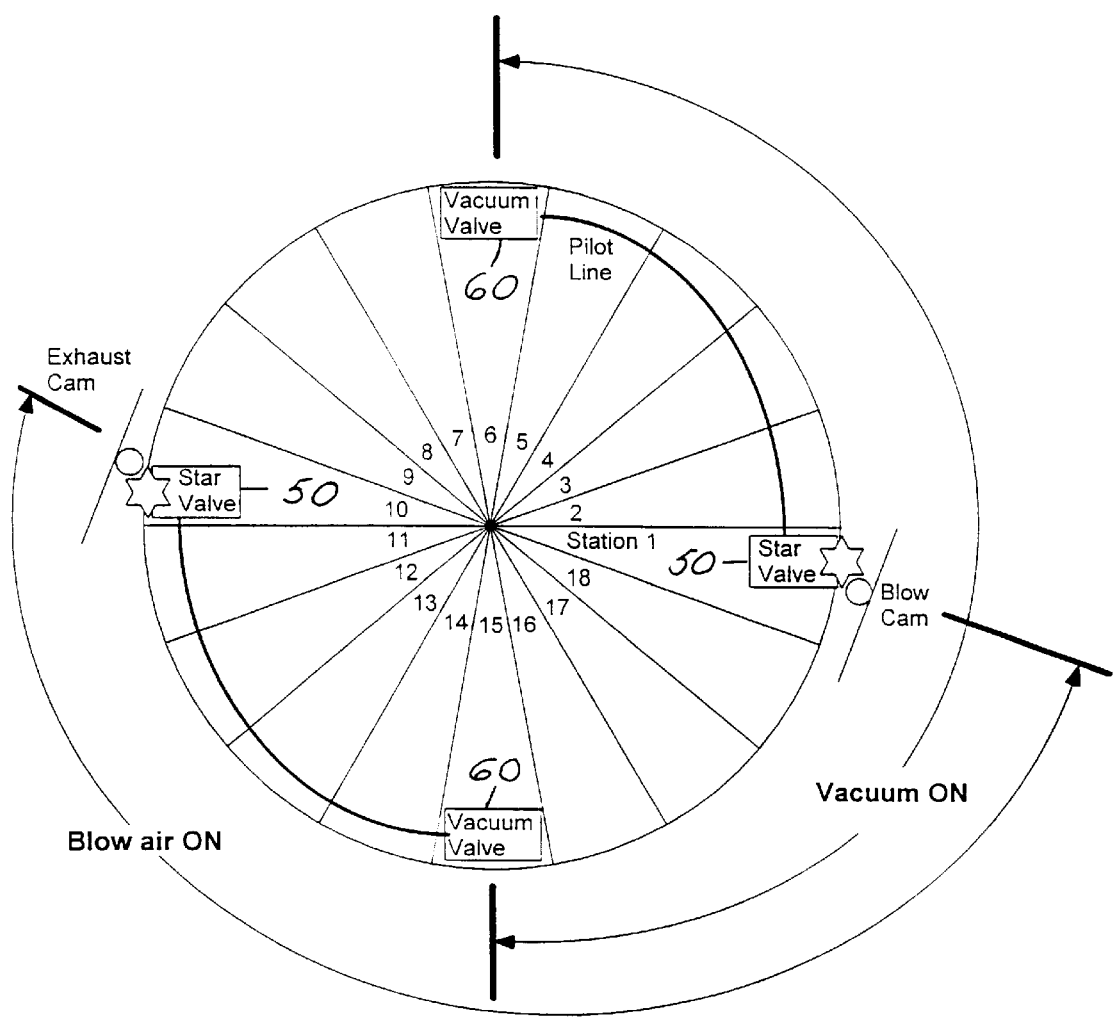
FIG. 25 is a schematic view similar to FIG. 24 of a system used in a rotary blow molding machine having more molds than that shown in FIG. 24.

In the schematics shown in FIG. 25, 18 sets of molds are provided and the placement of the blow valve, exhaust valve and vacuum valve are preferably positioned as indicated.

Figure 12:
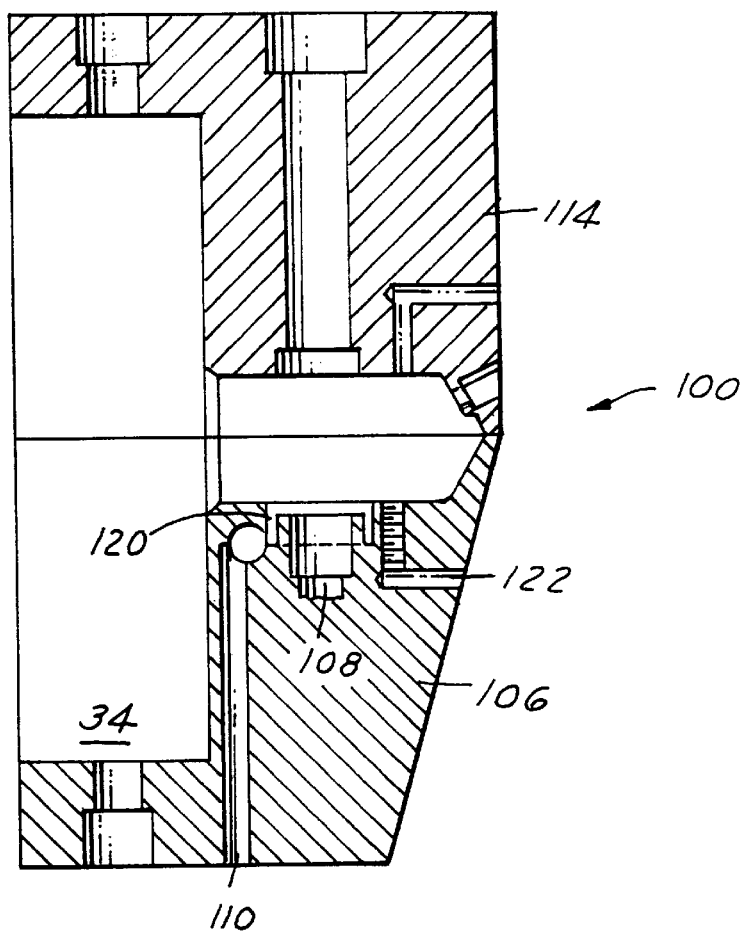
FIG. 12 is a fragmentary sectional view similar to FIG. 10 sharing the passage for providing a vacuum.
Figure 13:
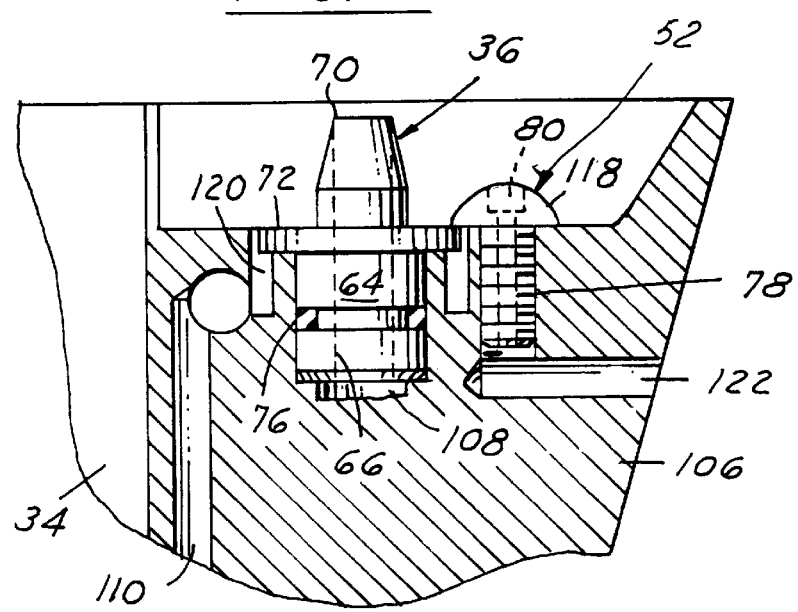
FIG. 13 is a fragmentary sectional view similar to FIG. 12 showing a fixed needle in position.
Figure 14:
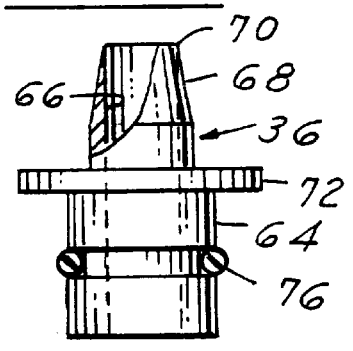
FIG. 14 is a part sectional elevated view of a fixed needle embodying the invention.
Figure 15:
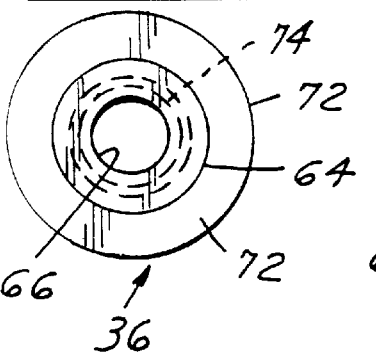
FIG. 15 is a bottom plan view of the fixed needle.
Figure 16:
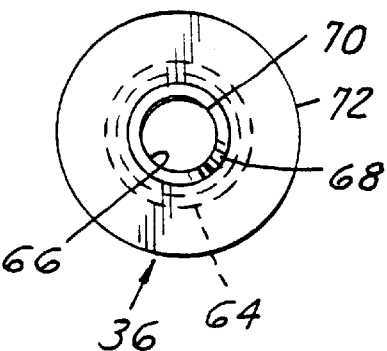
FIG. 16 is a top plan view of the fixed needle.
Figure 17:
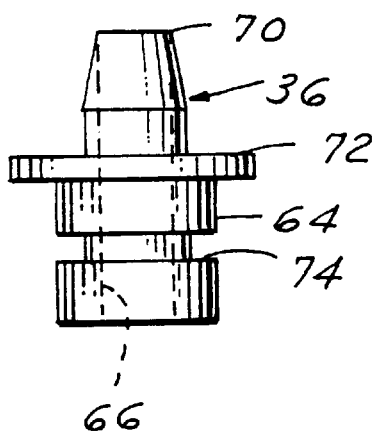
FIG. 17 is an elevational view of the fixed needle shown in FIGS. 14–16 with the O-ring removed.
Figure 18:
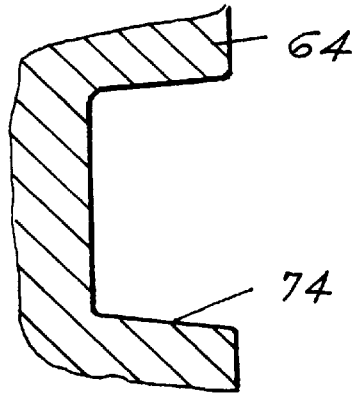
FIG. 18 is a fragmentary sectional view of the O-ring groove of the fixed needle.
Figure 19:
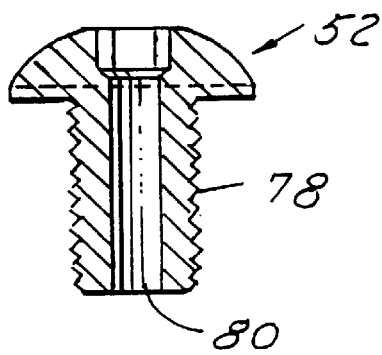
FIG. 19 is a sectional view taken along the lines 19—19 in FIG. 20.
Figure 20:
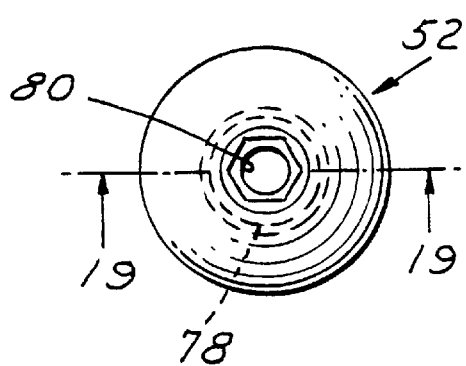
FIG. 20 is a plan view of a micro vent used in the invention.

Referring to FIGS. 14–18, a preferred needle 36 comprises a one-piece body 64 having a bore 66 defining the second or compressed air passage 42 (FIGS. 1–4). An annular passage 120 in the mold half (FIGS. 10–13) concentric with bore 66 and surrounding body 64 defines the vacuum passage. The nose 68 of the needle 36 is preferably shaped as truncated cone tapering to a sharp edge 70. Fixed needle 36 includes an annular flange 72. Body 64 of the needle is formed with an annular groove 74 that receives an O-ring 76. Vacuum line 38 extends through a passage 110 (FIGS. 12–13) in mold half 106 to the area above O-ring 76, as presently described, such that vacuum is drawn through passage 120 about the annular flange 72. As shown in FIGS. 19 and 20, the micro vents 52 each comprise a threaded headed screw 78 with a central passage 80 that has a diameter on the order of 1/16 inch to provide for venting of the area surrounding the molten plastic parison.

Referring to FIGS. 21–23, a modified form of needle comprises a double fixed needle comprising a body 122 having an axial passage 124 defined by a tube 126 and engaging an axial air inlet 128 in mold 130 and an annular passage 132 about the tube 126 to which blow air is supplied by a radial inlet 134 in the mold 130. Vacuum is provided about the body 122 by an annular passage 136. Such a double fixed needle has utility in hard to blow bottles and bottles requiring more exhaust area or passage.

Referring to FIGS. 5–11, the invention is described with respect to molds utilized on a wheel machine made in accordance with the aforementioned U.S. Pat. Nos. 4,523, 904; 4,549,865; and 4,648,831 for making a hollow container forming portion C with an integral hollow moil M which communicates with the container C. The needle 36 and micro vents 52 are associated with the moil forming portion of the mold. Each mold 100 comprises an upper mold half 102 and a lower mold half 104. Lower mold half 104 has a removable insert 106 in which a fixed needle 36 and a microvent 52 are positioned. The insert 106 includes a passage 108 which communicates with the bore 66 (FIGS. 14–17) of the needle 36 to provide compressed air, and a passage 110 which communicates with the annular passage 120 (FIGS. 6 and 10–13) surrounding the needle 36 to apply vacuum. The upper half 102 includes a removable insert 114 which has one or more exhaust micro vents 52 to the exterior through passages 122.

Among the advantages of the invention are:

1. The method and apparatus are simple and less complex.
2. There are no moving parts in the blow needle.
3. The cost of the blow needle is substantially less than a movable needle.
4. Mold costs are reduced because of the simplicity of placement, design and manufacturing.
5. The blow needle is more reliable.
6. Downtime for blowing failure is significantly reduced.
7. The operating window for blowing is wider which makes process start up easier.

It can thus be seen that there has been provided a method and apparatus wherein does to require a movable needle;

which has no moving parts; which is simpler to construct and maintain; which is less costly; which reduces mold costs by utilizing simplicity of placement, design and manufacture; which has less downtime; which is more reliable; which is more readily maintained; and which facilitates process start up.

What is claimed is:

1. Apparatus for blow molding comprising a blow mold comprising mold portions which when closed define a cavity, a fixed blow needle in at least one mold portion, said blow needle having an opening, fixed means in said one mold portion adjacent to and surrounding said fixed blow needle for pulling the molten plastic parison about the fixed blow needle, means for applying vacuum to the mold cavity to pull the molten plastic parison about the needle, and means for providing air through said opening in said fixed needle to tear the plastic and to expand the parison to the confines of the cavity mold.

2. The apparatus set forth in claim 1 wherein said means for pulling the parison comprises a fixed aperture in said one mold portion around the periphery of the fixed blow needle.

3. The apparatus set forth in claim 2 including at least one vent in said mold cavity to facilitate venting the space about a parison.

4. The apparatus set forth in claim 2 wherein the mold comprises a moil cavity portion and a body portion, said blow needle being in said moil cavity portion of said mold.

5. The apparatus set forth in claim 4 including a second fixed blow needle in said moil cavity portion and a second fixed aperture surrounding said second fixed needle.

6. The apparatus set forth in claim 5 wherein said means for applying a vacuum is adapted to apply vacuum to both said first and second apertures to draw the parison about said needles at said moil portion, before introducing air through said first and second needles, to tear the plastic and expand the parison to the confines of the moil cavity portion and body cavity portion.

7. The apparatus set forth in claim 1 wherein said means for providing air comprises a valve to control the flow of air to said fixed needle.

8. The apparatus set forth in claim 7 wherein said means for providing air includes an exhaust valve to exhaust air from said cavity.

9. The apparatus set forth in claim 7 wherein the valve comprises a combined valve for controlling the flow of air and the application of vacuum.

10. The apparatus set forth in claim 9 wherein said means for providing air includes an exhaust valve to exhaust air from said cavity.

11. The apparatus set forth in claim 1 including at least one vent in said mold cavity to facilitate venting the space about a parison.

12. The apparatus set forth in claim 11 wherein the mold comprises a moil cavity portion and a body portion, said blow needle being in said moil cavity portion of said mold.

13. The apparatus set forth in claim 12 including a second fixed blow needle in said moil cavity portion and a second fixed aperture surrounding said second fixed needle.

14. The apparatus set forth in claim 13 wherein said means for applying a vacuum is adapted to apply vacuum to both said first and second apertures to draw the parison about said needles at said moil portion, before introducing air through said first and second needles, to tear the plastic and expand the parison to the confines of the moil cavity portion and body cavity portion.

15. The apparatus set forth in claim 1 wherein said fixed needle has dual air passages that extend the length of the needle.

16. The apparatus set forth in claim 15 wherein said means for pulling the parison comprises a fixed aperture in said one mold portion around the periphery of the fixed blow needle.

17. The apparatus set forth in claim 16 wherein dual air passages comprises concentric air passages in said needle.

18. The apparatus set forth in any one of claims 1–8 comprising a plurality of blow molds, wherein each said blow mold includes a recess for receiving said fixed blow needle, said fixed means comprising a first passage defined by a space between said fixed needle and said recess.

19. The apparatus set forth in claim 18 wherein said means for controlling the application vacuum and air comprises means positioning said molds and their associated fixed means and fixed needles in a closed path, a first cam at first position about the closed path, a second cam at another position about said path, and an air control valve and an exhaust control valve on each mold such that the first cam actuates said air control valve of a mold at said first position and said second cam actuates said exhaust valve at said second position.

20. Apparatus for blow molding hollow plastic containers that comprises:

a blow mold having mold portions that, when closed, define a mold cavity, a fixed blow needle in at least one of the mold portions, a fixed aperture that opens into the mold cavity adjacent to said fixed needle for applying vacuum to the mold cavity, control valve means coupled to said fixed blow needle and to said fixed aperture for selectively applying air to said needle and vacuum to said aperture, and means for controlling operation of the valve means first to apply vacuum to the mold cavity through the aperture for pulling the molten plastic around the fixed blow needle, and then to apply air to the blow needle to blow the parison to the confines of the mold cavity.

21. The apparatus set forth in claim 20 comprising a plurality of said blow molds movable about a closed path, a fixed blow needle and a fixed aperture adjacent to the blow needle in each of said molds, a plurality of control valves each associated with one of said molds, means coupling the fixed blow needle of each said mold to the associated control valve, and means coupling the fixed aperture of each said mold to another control valve, and means for actuating each of said control valves in turn as said molds and valves move through said closed path so that vacuum is applied to each said mold in turn before air is applied to each said mold.

* * * * *